US012646032B2

(12) United States Patent
Oberemk et al.

(10) Patent No.: US 12,646,032 B2
(45) Date of Patent: Jun. 2, 2026

(54) USING A TRAINED MACHINE-LEARNING MODEL OF AN ONLINE SYSTEM TO HANDLE UNCLAIMED ONLINE PICKUP ORDERS

(71) Applicant: Maplebear Inc., San Francisco, CA (US)

(72) Inventors: Mark Oberemk, Toronto (CA); Brent Scheibelhut, Toronto (CA); Amalia Rothschild-Keita, Berkeley, CA (US); Hua Xiao, Toronto (CA); Charles Wesley, San Diego, CA (US); Naval Shah, Toronto (CA)

(73) Assignee: Maplebear Inc., San Francisco, CA (US)

( * ) Notice: Subject to any disclaimer, the term of this patent is extended or adjusted under 35 U.S.C. 154(b) by 94 days.

(21) Appl. No.: 18/761,074

(22) Filed: Jul. 1, 2024

(65) Prior Publication Data
US 2026/0004230 A1    Jan. 1, 2026

(51) Int. Cl.
*G06Q 10/087* (2023.01)
*G06Q 30/0601* (2023.01)

(52) U.S. Cl.
CPC ....... *G06Q 10/087* (2013.01); *G06Q 30/0601* (2013.01)

(58) Field of Classification Search
CPC .......................... G06Q 10/087; G06Q 30/0601
See application file for complete search history.

(56) References Cited

U.S. PATENT DOCUMENTS

| | | | |
|---|---|---|---|
| 2025/0259226 A1* | 8/2025 | Shah ................... | G06Q 30/0635 |
| 2025/0265534 A1* | 8/2025 | Makhijani ............ | G06Q 10/083 |
| 2025/0299147 A1* | 9/2025 | Meunier .............. | G06Q 10/083 |
| 2025/0315781 A1* | 10/2025 | Mesard .............. | G06Q 30/0633 |
| 2025/0328859 A1* | 10/2025 | Meunier ................ | G06V 20/50 |

FOREIGN PATENT DOCUMENTS

WO      WO-2017161365 A1 *  9/2017  ......... G06Q 30/0623

* cited by examiner

*Primary Examiner* — Garcia Ade
(74) *Attorney, Agent, or Firm* — Fenwick & West LLP

(57) ABSTRACT

An online system uses a trained model for intelligent handling of unclaimed online pickup orders. After identifying that an order placed by a user of the online system is unclaimed at a location of a source, the online system obtains, from a device of a picker associated with the online system and/or a device associated with the source, signals with information about each item in each bundle of the unclaimed order. The online system applies the trained model to identify, based on the obtained signals, a preferred method for disposal of each bundle. Based on the identified preferred method for disposal of each bundle, the online system generates a disposal decision signal and communicates the disposal decision signal to the device associated with the source that prompts personnel at the location of the source to dispose each bundle of the unclaimed order using the identified preferred disposal method.

19 Claims, 4 Drawing Sheets

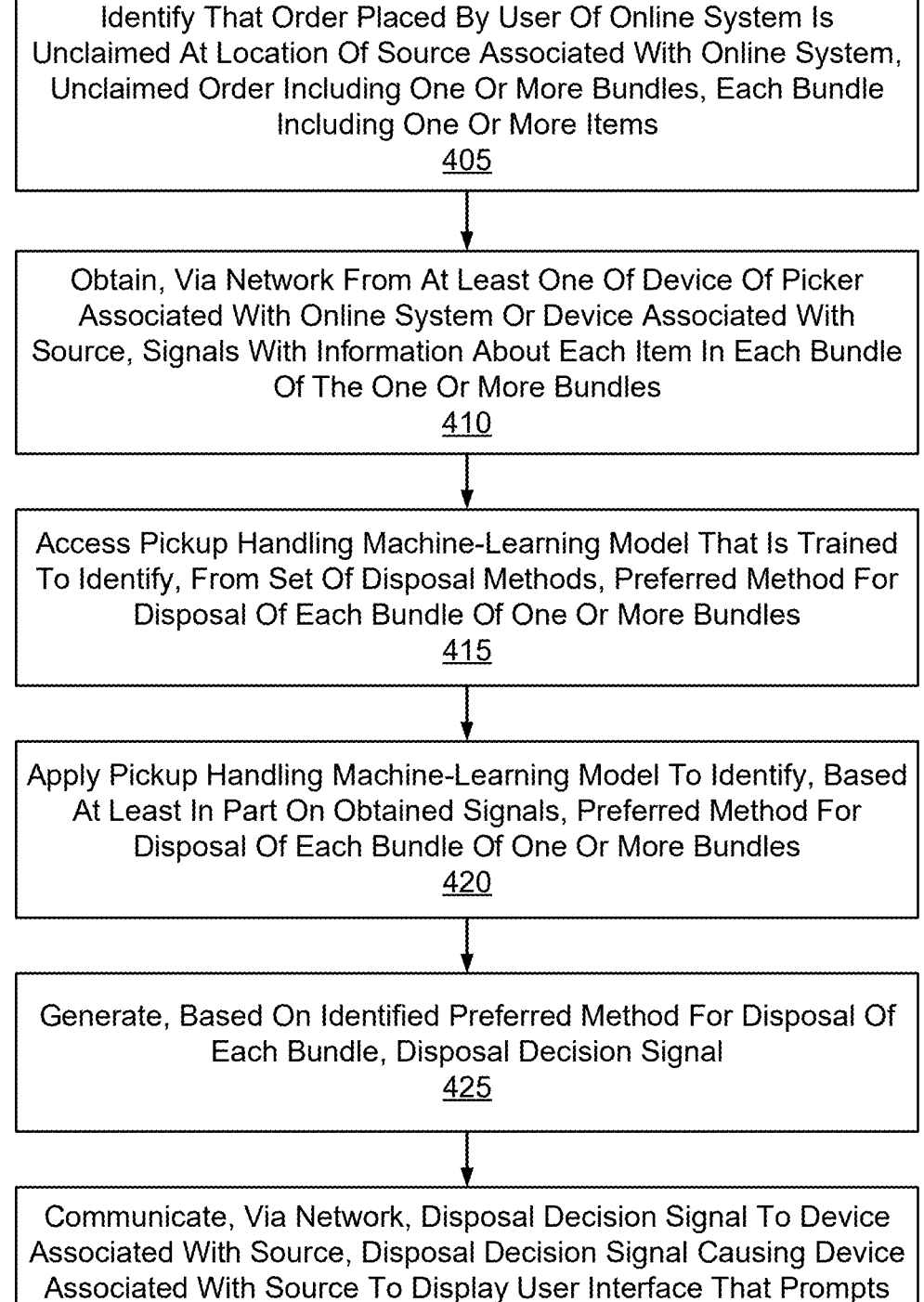

Identify That Order Placed By User Of Online System Is Unclaimed At Location Of Source Associated With Online System, Unclaimed Order Including One Or More Bundles, Each Bundle Including One Or More Items
405

Obtain, Via Network From At Least One Of Device Of Picker Associated With Online System Or Device Associated With Source, Signals With Information About Each Item In Each Bundle Of The One Or More Bundles
410

Access Pickup Handling Machine-Learning Model That Is Trained To Identify, From Set Of Disposal Methods, Preferred Method For Disposal Of Each Bundle Of One Or More Bundles
415

Apply Pickup Handling Machine-Learning Model To Identify, Based At Least In Part On Obtained Signals, Preferred Method For Disposal Of Each Bundle Of One Or More Bundles
420

Generate, Based On Identified Preferred Method For Disposal Of Each Bundle, Disposal Decision Signal
425

Communicate, Via Network, Disposal Decision Signal To Device Associated With Source, Disposal Decision Signal Causing Device Associated With Source To Display User Interface That Prompts Personnel At Location Of Source To Dispose Each Bundle Of One Or More Bundles Using Identified Preferred Method For Disposal
430

FIG. 4

USING A TRAINED MACHINE-LEARNING MODEL OF AN ONLINE SYSTEM TO HANDLE UNCLAIMED ONLINE PICKUP ORDERS

BACKGROUND

When users of an online system schedule orders for pickup and then fail to collect the orders, the store is left with orders that now need to somehow be dealt with. Therefore, it is desirable to automatically and at a large scale handle these unclaimed pickup orders to improve efficiency at grocery stores and avoid throwing away large quantities of items.

SUMMARY

Embodiments of the present disclosure are directed to using a trained machine-learning model of an online system to handle (i.e., dispose) unclaimed online pickup orders. In accordance with one or more aspects of the disclosure, the online system identifies that an order placed by a user of the online system is unclaimed at a location of a source associated with the online system, the unclaimed order including one or more bundles, each of the one or more bundles including one or more items. The online system obtains, via a network from at least one of a device of a picker associated with the online system or a device associated with the source, signals with information about each item in each bundle of the one or more bundles. The online system accesses a pickup handling machine-learning model of the online system, wherein the pickup handling machine-learning model is trained to identify, from a set of disposal methods, a preferred method for disposal of each bundle of the one or more bundles. The online system applies the pickup handling machine-learning model to identify, based at least in part on the obtained signals, the preferred method for disposal of each bundle of the one or more bundles. The online system generates, based on the identified preferred method for disposal of each bundle, a disposal decision signal. The online system communicates, via the network, the disposal decision signal to the device associated with the source, the disposal decision signal causing the device associated with the source to display a user interface that prompts personnel at the location of the source to dispose each bundle of the one or more bundles using the identified preferred method for disposal.

BRIEF DESCRIPTION OF THE DRAWINGS

FIG. 4 is a flowchart for a method of using a trained machine-learning model of an online system to handle unclaimed online pickup orders, in accordance with one or more embodiments.

DETAILED DESCRIPTION

Figure 1:
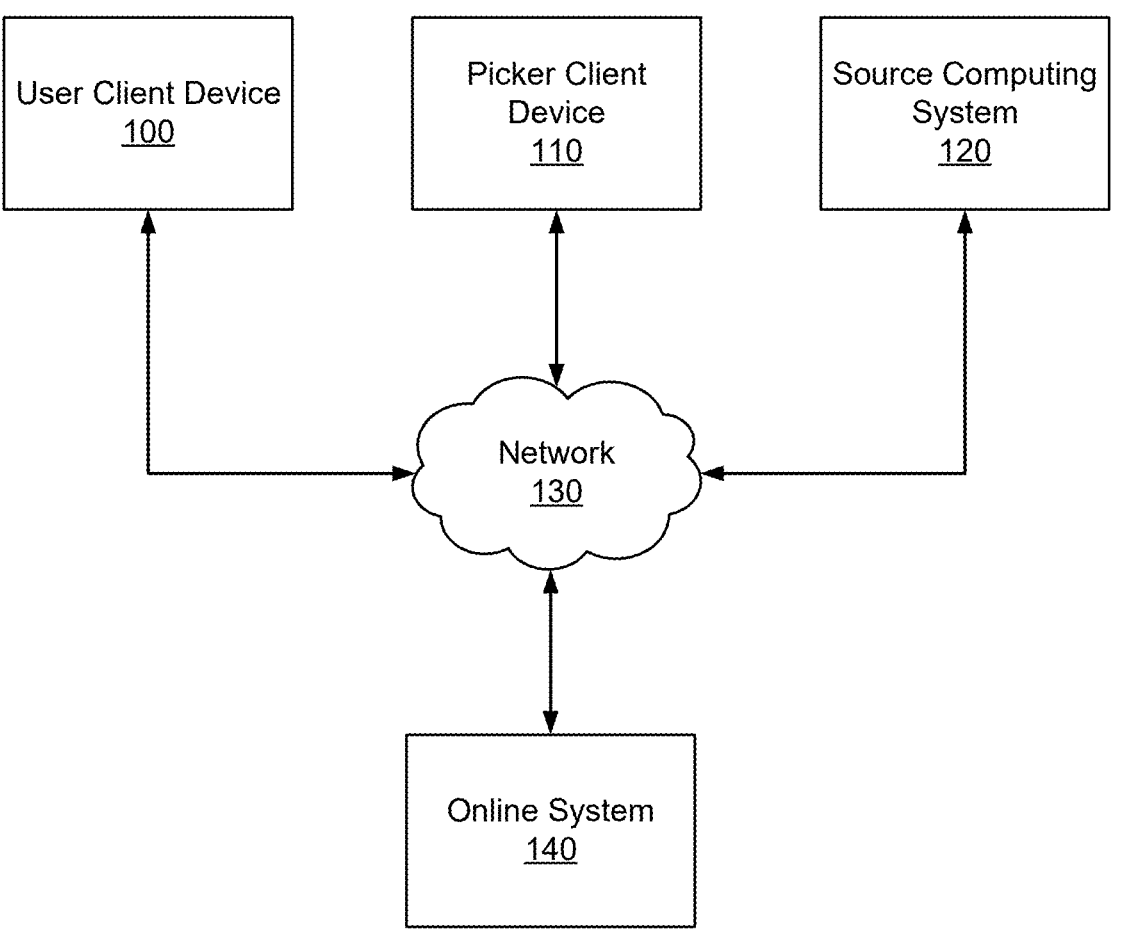
FIG. 1 illustrates an example system environment for an online system, in accordance with one or more embodiments.

FIG. 1 illustrates an example system environment for an online system 140, in accordance with one or more embodiments. The system environment illustrated in FIG. 1 includes a user client device 100, a picker client device 110, a source computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1, any number of users, pickers, and sources may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to an "ordering list." An "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all the items for an order. The picker client device 110 may include a barcode scanner that can decode an item identifier encoded in a machine-readable label (e.g., a barcode or a QR code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may determine the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item.

When the picker has collected the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order. Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with a smart shopping cart being used by a user to collect items in a source location. For example, the smart shopping cart may display content received from the online system 140 and may receive data describing items that are collected by the user and stored in a storage area of the shopping cart. In some embodiments, the smart shopping cart is a picker client device 110 being operated by a picker collecting items within a source location. Similarly, the smart shopping cart may be operated by a user within the source location collecting items for themselves. Example embodiments of smart shopping carts are described in U.S. patent application Ser. No. 18/630,672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, warehouse, or any other source from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 receives orders from a user client device 100 through the network 130. The online system 140 selects a picker to service the user's order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a grocery store source. The user's order may specify which groceries they want to be delivered from the grocery store and the quantities of each of the groceries. The user's client device 100 transmits the user's order to the online system 140 and the online system 140 selects a picker to travel to the grocery store source location to collect the groceries ordered by the user. The online system transmits an offer to the picker for the picker to service the order in exchange for consideration and, if the picker accepts the offer, the picker collects the groceries from the grocery store. Once the picker has collected the groceries ordered by the user, the picker delivers the groceries to a location transmitted to the picker client device 110 by the online system 140.

Personnel at a source location assemble items for a user's online order so the user can pick up the order at a scheduled time. When the user fails to collect the online order at the source location, the source location employee must determine how to handle items in the order (e.g., restock all or portion of the bundle of items, put the bundle of items in a sale bin, donate, throw away, etc.). To facilitate this decision, the online system 140 (e.g., the computer system) obtains information about the order, which may be divided among multiple bundles of items and placed in different staging areas (e.g., storage bins, refrigerated, etc.). For the items in an unclaimed order, the online system 140 uses one or more machine-learning models to classify items (or bundles of items) for mapping to recommended disposal solutions for each item or bundle of items. In one or more embodiments, the online system 140 applies a trained model (e.g., machine-learning model) to each bundle of items to determine which disposal action to take for each bundle of items. Alternatively, the online system 140 may use a trained multi-stage model (e.g., multi-stage machine-learning model), which first predicts features for each item (e.g., cost to restock, loss if thrown away, etc.) that are then provided to a second stage of the multi-stage model that scores the possible actions for each bundle of items within an unclaimed order. Hence, the online system 140 presented herein aims to handle an unclaimed order by analyzing the content of unclaimed order, evaluating each item within the unclaimed order to offer a recommended solution for each item or each bundle of items within the unclaimed order. The online system 140 is described in further detail below with regards to FIG. 2.

Figure 2:
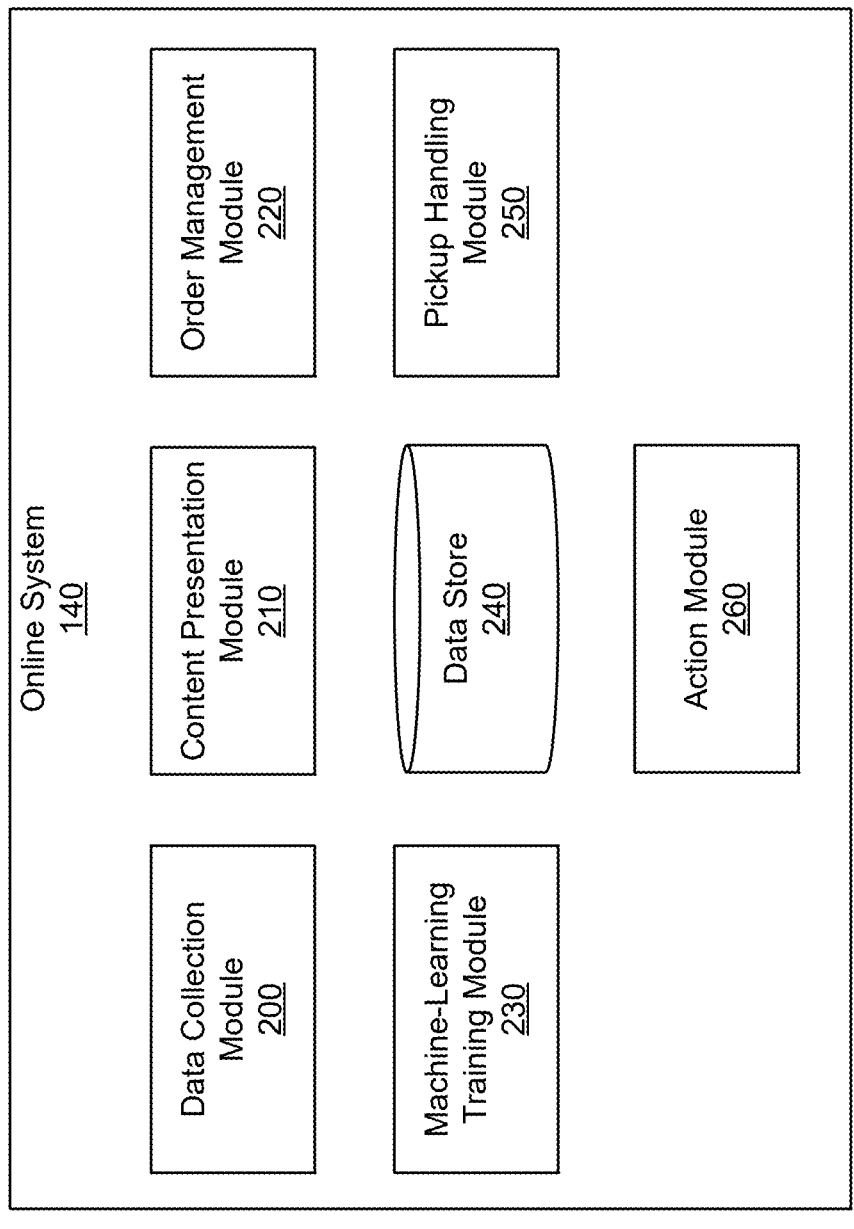
FIG. 2 illustrates an example system architecture for an online system, in accordance with one or more embodiments.

FIG. 2 illustrates an example system architecture for the online system 140, in accordance with some embodiments. The system architecture illustrated in FIG. 2 includes a data collection module 200, a content presentation module 210, an order management module 220, a machine-learning training module 230, a data store 240, a pickup handling module 250, and an action module 260. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/ source location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from the source computing system 120, the picker client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

While user data, picker data, source data, item data, and order data are described separately, data collected by the data collection module 200 may fall into more than one of these categories. For example, data describing a picker's performance for an order may be order data and picker data.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and offers the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to offer an order to a picker based on a delivery timeframe requested by the user with the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested timeframe. Thus, when the order management module 220 receives an order, the order management module 220 may delay offering the order to a picker if the requested timeframe is far enough in the future (i.e., the picker may be offered the order at a later time and is still predicted to meet the requested timeframe).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

The machine-learning training module 230 trains machine-learning models used by the online system 140. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large-language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In some embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, order data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

The pickup handling module 250 may first decide that an order is unclaimed (or abandoned). In one or more embodiments, the pickup handling module 250 decides that the order is unclaimed if the order has not been picked up after a threshold time following the scheduled pickup time. Once an order has been unclaimed by the original intended recipient, the order concept can be discarded and instead the pickup handling module 250 may focus on how the order was physically packaged into a number of different groupings referred to herein as "bundles". Each bundle in an order may encompass an assorted set of items which have been physically packaged together, where a set of bundles ultimately makes up the order.

The pickup handling module 250 may access a pickup handling model (e.g., machine-learning model) that is trained to identify a recommended solution for handling each bundle of items of an unclaimed order. The pickup handling module 250 may deploy the pickup handling model to run a machine-learning algorithm to output, based on a set of inputs, a score for each possible solution for handling the bundle of items of the unclaimed order. The pickup handling module 250 may then identify the recommended solution for handling the bundle of items as a solution with the highest score among all possible handling solutions. A set of parameters for the pickup handling model may be stored at one or more non-transitory computer-readable media of the pickup handling module 250. Alternatively, the set of parameters for the pickup handling model may be stored at one or more non-transitory computer-readable media of the data store 240.

The pickup handling module 250 may provide the set of inputs representing various input features to the pickup handling model. In providing the set of inputs to the pickup handling model, the pickup handling module 250 may provide various signals related to each bundle of items in an unclaimed order. The unclaimed order may include multiple bundles as staged, where a bundle can be defined as a set of items which have been staged together within a storage medium at a source location (e.g., bag, crate, etc.). Hence, each bundle contains a subset of items of the unclaimed order.

In providing the set of inputs to the pickup handling model, the pickup handling module 250 may provide information about what items are in a given bundle, i.e., bundle information. The bundle information may be known from a packing plan for the order, through the use of a computer vision of bags and/or crates in the source location, etc. Information about the packing plan may be received at the online system 140 (e.g., via the pickup handling module 250) from the picker client device 110 via the network 130. Data gathered through the computer vision of bags or crates in the source location may be received at the online system 140 (e.g., via the pickup handling module 250) from the source computing system 120 via the network 130.

In providing the set of inputs to the pickup handling model, the pickup handling module 250 may further provide information about one or more storage conditions for a bundle of items, such as information about storage temperature data for items in the bundle (especially important for perishable goods that require refrigeration or freezing), information about humidity levels of spaces where the items are stored (especially important for items sensitive to moisture), information about a duration for which the items have been stored since the bundle was prepared (especially important for assessing freshness and viability of items in the bundle), information about bundle storage location in the source location, i.e., bundle container information (e.g., bag, crate, box, etc.), some other storage condition information, or some combination thereof. The information about one or more storage conditions may be received at the online system 140 (e.g., via the pickup handling module 250) from the source computing system 120 via the network 130.

In providing the set of inputs to the pickup handling model, the pickup handling module 250 may further provide order item information related to a given bundle, such as identifiers of items in the bundle, names of items in the bundle, taxonomy nodes an item in the bundle belongs to (e.g., produce, dairy, dry goods, etc.), information about expiry dates of items in the bundle, a number of each item within the bundle, a total item size or weight within the bundle, information about difficulty of restocking one or more items that belong to the bundle, some item information, or some combination thereof. The order item information may be received at the online system 140 (e.g., via the pickup handling module 250) from the user client device 100, the picker client device 110, and/or the source computing system 120 via the network 130.

In providing the set of inputs to the pickup handling model, the pickup handling module 250 may further provide packaging information, such as information on whether an item in a bundle is a prepackaged (or sealed) good, information on whether an item in a bundle is a loose item or pulled from somewhere such as a meat or cheese counter, information on whether an item in a bundle has been prepared or otherwise transformed from raw form (e.g., a slab of meat that has been precut by the butcher), some other information about packaging of items, or some combination thereof. The packaging information may be received at the online system 140 (e.g., via the pickup handling module 250) from the picker client device 110, and/or the source computing system 120 via the network 130.

In providing the set of inputs to the pickup handling model, the pickup handling module 250 may further provide external data, such as information on whether any recalls have been issued of one or more items in a bundle, information about market demand forecasts indicating projected item demand, information on whether there would be any tax benefits which could be taken in lieu of profit if an item in a bundle is donated, information on what sort of disposal methods are available at the source location for old food (e.g., composting, donation agreements, or landfill), some other external data, or some combination thereof. The external data may be received at the online system 140 (e.g., via the pickup handling module 250) from the source computing system 120 via the network 130. Additionally, in providing the set of inputs to the pickup handling model, the pickup handling module 250 may further provide regulatory information, such as information about local food safety regulations and guidelines that must be adhered to when restocking items. The regulatory information may be received at the online system 140 (e.g., via the pickup handling module 250) from the source computing system 120 via the network 130 or may be retrieved from the data store 240.

In one or more embodiments, the pickup handling module 250 applies the pickup handling model to the set of inputs related to each item in a given bundle, i.e., the pickup handling model is run on each item in the bundle. The pickup handling model may output scores per bundle for different disposal solutions, such as restock, throw away, compost, donate, put in sale bin, disassemble bundle and restock/trash on a per item basis, etc. The pickup handling module 250 may then identify a recommended disposal solution for a given bundle as the one with the highest score among all possible disposal solutions.

In one or more other embodiments, the pickup handling model is implemented as a multi-stage model that includes a first pickup handling sub-model (e.g., first machine-learning model) and a second pickup handling sub-model (e.g., second machine-learning model), where one or more outputs of the first pickup handling sub-model may represent one or more inputs of the second pickup handling sub-model. A first subset of parameters for the first pickup handling sub-model may be stored at one or more non-transitory computer-readable media of the pickup handling module 250. Alternatively, the first subset of parameters for the first pickup handling sub-model may be stored at one or more non-transitory computer-readable media of the data store 240. A second subset of parameters for the second pickup handling sub-model may be stored at one or more non-transitory computer-readable media of the pickup handling module 250. Alternatively, the second subset of parameters for the second pickup handling sub-model may be stored at one or more non-transitory computer-readable media of the data store 240.

The first pickup handling sub-model may output, based on the set of inputs, a list of useful information on a per-item basis. For example, the first pickup handling sub-model may output predicted time and/or cost for restocking of an item from a bundle, loss if the item is thrown away, loss if the item is put in sale bin, etc. Outputs of the first pickup handling sub-model may be then input to the second pickup handling sub-model, and the pickup handling second sub-model may output, based on inputs generated by the first pickup handling sub-model, scores per bundle for different disposal solutions (i.e., the same form of output as in the case of single stage pickup handling model). The pickup handling module 250 may then identify a recommended disposal solution for a given bundle as the one with the highest score among all possible disposal solutions.

In one or more embodiments, given the set of inputs, the first pickup handling sub-model may run a machine-learning algorithm to output a set of handling recommendation scores for each item in a bundle with which the bundle overall can be later categorized (e.g., by applying the second pickup handling sub-model). The first pickup handling sub-model may thus provide, for a given set of handling methods available at the source location, a score for how appropriate a corresponding handling method from the set of handling methods would be for each item in the bundle. The set of available handling methods for an item may be, e.g., restocking, giving to assorted different charities and food banks, selling on food "flash sale" applications, giving to food waste disposal providers (with subtypes such as agriculture composters, cooking oil collection, etc.), throwing away, etc. The set of handling methods can be expanded to be inclusive of multiple possible avenues for each handling method.

Each handling recommendation score from the set of handling recommendation scores may be set to have a corresponding success threshold score. If a handling recommendation score for an item in a bundle is greater than a corresponding success threshold score, this would be an indication that the item can be successfully dealt with using a handling method associated with the handling recommendation score. By then sorting the allowable handling methods by the highest handling recommendation score, the first pickup handling sub-model may identify a preferred handling method for each item in the bundle. The first pickup handling sub-model may then feed this output across all items within the bundle into the second pickup handling sub-model which is trained to identify a preferred handling method for dealing with the unclaimed bundle overall. For example, if a bundle has a few items which are restockable, but it is difficult to implement restocking (e.g., because they are physically distant on the planogram from each other and would require significant time to put them back), and the first pickup handling sub-model predicts the rest of item in the bundle would be best suited for donation, the second pickup handling sub-model that it would be preferred to simply donate the entire bundle to save effort. In another example, if the first pickup handling sub-model predicts that it is preferred to restock an item from a bundle but then dispose all the rest via donation, then the second pickup handling sub-model may recommend decomposing the bundle and then provide handling recommendation scores for each new bundle.

The machine-learning training module 230 may perform initial training of the pickup handling model using training data. The machine-learning training module 230 may generate the training data by using manual labeling, economic impact calculations (e.g., cost-benefit analysis), or some other cold start data. The machine-learning training module 230 may train the pickup handling model using the training data to generate initial values for the set of parameters of the pickup handling model, including the first subset of parameters of the first pickup handling sub-model and the second subset of parameters of the second pickup handling sub-model.

The machine-learning training module 230 may utilize existing data for pick cost per item (e.g., as retrieved from the database 240) as cold start data for initial training of the pickup handling model include. The pick cost per item data may be used as an approximation of how long restocking would take for a given item in a bundle, as the pick cost per item is approximately equivalent to a travel time from a start (e.g., an entrance of the source location vs. a pickup area usually near the entrance) to an end (e.g., location of item), with some additional buffer to represent the complexity of restocking an item nicely for display. Additionally or alternatively, the machine-learning training module 230 may generate the training data by applying the disposal strategy weighting, where weights for different disposal strategies can be determined internally at training time and updated dynamically starting with static weights that were initially applied. Additionally or alternatively, during initial training of the pickup handling model, the online system 140 may query staff at a source location to provide their own rankings for each disposal method for a given bundle. Each ranking score along with corresponding metadata (e.g., time of day that the ranking score was given for) may be fed back to the machine-learning training module 230 as sample result data for outputs of the pickup handling model and used for initial training of the pickup handling model to generate initial values for the set of parameters of the pickup handling model.

The pickup handling module 250 may pass information about a preferred disposal solution for a given bundle as identified by the pickup handling model to the action module 260. Based on the information about the preferred disposal solution for the given bundle, the action module 260 may generate a corresponding message for a source location employee with a recommendation for disposal of the given bundle using the identified preferred disposal solution. The action module 260 may communicate the message to the source computing system 120 via the network 130.

The machine-learning training module 230 may collect feedback data with information about any actions conducted by source location employees in response to recommendation messages from the action module to the source computing system 120 about identified preferred disposal solutions for various bundles of items action module 260 (e.g., as identified by the pickup handling model). Hence, the online system 140 may observe what a source location employee actually does with each bundle in response to a recommendation message and collect the feedback data with information about the source location employee's actions (i.e., the actual decisions made by source location employees), which represent ground truth data. The machine-learning training module 230 may then re-train the pickup handling model by updating the set of parameters of the pickup handling model (including the first subset of parameters of the first pickup handling sub-model and the second subset of parameters of the second pickup handling sub-model) using the collected feedback data that include the ground truth data.

In one or more embodiments, based on feedback from the source location employees, the machine-learning training module 230 can dynamically adjust the scoring thresholds used by the pickup handling model for classification of disposal methods. For example, when the action module 260 provides a recommendation message to the source computing system 120 directing a source location employee to restock items from a bundle, the source location employee could mark a restocking decision as incorrect and perform some other disposal action (e.g., donating the items). Information about this decision change may be recorded by the source computing system 120, communicated back to the online system 140 (e.g., to the machine-learning training module 230), and utilized for re-training of the pickup handling model and adjusting the scoring thresholds for classification of disposal methods.

Additionally or alternatively, the decisions about disposal methods identified by the pickup handling model may be tweaked by the source location management to "tilt" towards specific strategies that they believe are more suited for their specific situation. The overall distribution of this disposal strategy weighting across multiple source locations can then be incorporated into the feedback data and utilized by the machine-learning training module 230 for adjusting the default values of the scoring thresholds for classification of disposal methods. Also note that, for food safety reasons, the pickup handling model should generally err on the side of disposal (e.g., garbage or compost) instead of sending items back out for human consumption, and thus the scoring thresholds for garbage and compost disposal methods should be lower than for item restocking and donating. Alternatively or additionally, a source location staff interface (e.g., user interface of the source computing system 120) may allow for the source location staff to override any strategy suggestions provided by the action module 260 based on their own judgement (e.g., staff sees that eggs were not stored properly for several hours and decides to compost the items instead of restocking them). Information about the override action may be recorded by the source computing system 120, communicated back to the online system 140 (e.g., to the machine-learning training module 230), and utilized for re-training of the pickup handling model.

In one or more embodiments, the online system 140 (e.g., the machine-learning training module 230) collects feedback data with information about the actual time taken for each given disposal strategy. The information about the actual time may include information on how long does restocking take for a bundle in actuality, information on how long it takes for an item put up for flash sale to actually get sold, if it does at all, information on how responsive a charity organization is to the pickup request, some other timing information, or some combination thereof. The aforementioned timing information may be captured by source location staff at the user interface of the source computing system 120 by marking a batch disposal strategy as "begun" and "completed" with the time difference between these two timestamps being the estimated time to complete batch disposal strategy. The captured timing information may be then communicated back to the online system 140 (e.g., to the machine-learning training module 230), and utilized for re-training of the pickup handling model. The goal of re-training the pickup handling model would be to minimize the source location employee time needed to deal with unclaimed orders.

Figure 3:
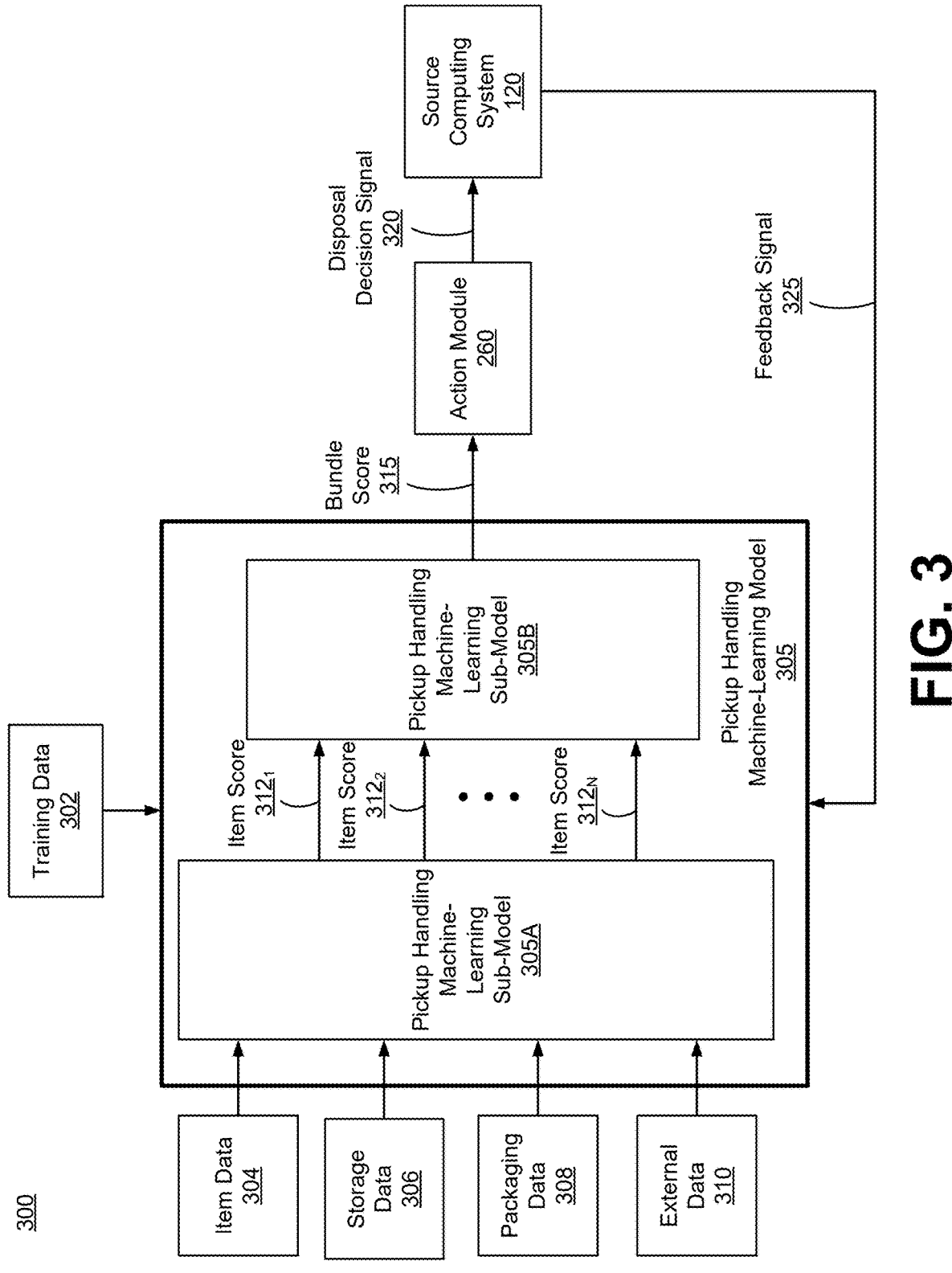
FIG. 3 illustrates an example architectural flow diagram of using a trained machine-learning model of an online system to handle unclaimed online pickup orders, in accordance with one or more embodiments.

FIG. 3 illustrates an example architectural flow diagram 300 of using a pickup handling machine-learning model 305 of the online system 140 to handle unclaimed online pickup orders, in accordance with one or more embodiments. As shown in FIG. 3, the pickup handling machine-learning model 305 may include a pickup handling machine-learning sub-model 305A and a pickup handling machine-learning sub-model 305B. First, the online system 140 may perform (e.g., via the machine-learning training module 230) initial training of the pickup handling machine-learning model 305 using training data 302 to generate initial values for the set of parameters of the pickup handling machine-learning model 305, including a set of parameters of the pickup handling machine-learning sub-model 305A and a set of parameters of the pickup handling machine-learning sub-model 305B. The training data 302 may be generated (e.g., via the machine-learning training module 230) by retrieving (e.g., from the data store 240) data with information about a cost for picking each item from a collection of items, querying employees at a source location to provide ranking of each disposal method from a set of possible disposal methods for disposing each bundle from a collection of bundles or for disposing each item from a collection of items, using some other method, or some combination thereof. After the training process is completed, the online system 140 may provide various inputs to the pickup handling model 305 (e.g., via the pickup handling module 250), such as item data 304, storage data 306, packaging data 308, and/or external data 310. Some additional input features not shown in FIG. 3 suitable for identifying a preferred method for disposing a bundle of an unclaimed online pickup order may be further provided to the pickup handling model 305.

In providing the item data 304 to the pickup handling machine-learning model 305 (or, more specifically to the pickup handling sub-model 305A), the online system 140 may provide (e.g., via the pickup handling module 250) data with information about what items are placed within a bundle of an unclaimed order, identifiers of items in the bundle, names of items in the bundle, taxonomy nodes items in the bundle belongs to, information about expiry dates of items in the bundle, a number of each item within the bundle, a size or weight of each item in the bundle, information about difficulty of restocking one or more items in the bundle, some other item-related data, or some combination thereof. The item data 304 may be received at the online system 140 (e.g., via the pickup handling module 250) from the user client device 100, the picker client device 110, and/or the source computing system 120 via the network 130.

In providing the storage data 306 to the pickup handling machine-learning model 305 (or, more specifically to the pickup handling machine-learning sub-model 305A), the online system 140 may provide (e.g., via the pickup handling module 250) data with information about one or more storage conditions for a bundle of an unclaimed order, such as storage temperature data for items in the bundle, information about humidity of a space where the items of the bundle are stored, information about a duration for which the items have been stored since the bundle was prepared, information about bundle storage location in the source location, some other storage condition information, or some combination thereof. The storage data 306 may be received at the online system 140 (e.g., via the pickup handling module 250) from the source computing system 120 via the network 130.

In providing the packaging data 308 to the pickup handling machine-learning model 305 (or, more specifically to the pickup handling machine-learning sub-model 305A), the online system 140 may provide (e.g., via the pickup handling module 250) data with information on whether any item in a bundle of an unclaimed order is a prepackaged (or sealed) good, information on whether any item in the bundle is a loose item or pulled from somewhere such as a meat or cheese counter, information on whether any item in the bundle has been prepared or otherwise transformed from raw form, some other information about packaging of items, or some combination thereof. The packaging data 308 may be received at the online system 140 (e.g., via the pickup handling module 250) from the picker client device 110, and/or the source computing system 120 via the network 130.

In providing the external data 310 to the pickup handling machine-learning model 305 (or, more specifically to the pickup handling machine-learning sub-model 305A), the online system 140 may provide (e.g., via the pickup handling module 250) data with information on whether any recall has been issued for any item in a bundle of an unclaimed order, information about demand for any item in the bundle, information on any tax benefit if any item in the bundle is donated, information on what disposal methods are available at a source location, information about local food safety regulations and guidelines that must be adhered to when restocking any item from the bundle, some other external data, or some combination thereof. The external data 310 may be received at the online system 140 (e.g., via the pickup handling module 250) from the source computing system 120 via the network 130 and/or retrieved from the data store 240.

The pickup handling machine-learning sub-model 305A may apply a machine-learning algorithm on a per-item basis to the item data 304, the storage data 306, the packaging data 308, and/or the external data 310 to output item scores $312_1$, $312_2, \ldots, 312_N$, where each item score $312_1, 312_2, \ldots,$ $312_N$ is associated with a corresponding item of a set of N items in the bundle of the unclaimed order. Each score $312_1,$ $312_2, \ldots, 312_N$ may be related to a preferred method for disposal of the corresponding item in the bundle and may further include an identifier of the preferred method for disposal of the corresponding item. Each score $312_1,$ $312_2, \ldots, 312_N$ may be identified by the pickup handling machine-learning sub-model 305A as a highest score among a set of scores associated with a set of possible disposal methods for the corresponding item in the bundle. Each score $312_1, 312_2, \ldots, 312_N$ may be a value (e.g., between 0 and 1) that is indicative of how successful the preferred method for disposal of the corresponding item in the bundle may be if applied. The higher the score $312_1, 312_2, \ldots, 312_N$ is, the more successful the preferred method for disposal may be. Each score $312_1, 312_2, \ldots, 312_N$ together with an identifier of a preferred method for disposal of the corresponding item in the bundle may be passed to the pickup handling machine-learning sub-model 305B.

The pickup handling machine-learning sub-model 305B may apply a machine-learning algorithm to the scores $312_1,$ $312_2, \ldots, 312_N$ as well as to some of the item data 304, the storage data 306, the packaging data 308, and/or the external data 310 to output a bundle score 315 that is indicative of how successfully the bundle of the unclaimed order can be disposed using an identified preferred disposal method from the set of possible disposal methods. The bundle score 315 may be identified by the pickup handling machine-learning sub-model 305B as a highest score among a set of scores associated with the set of possible methods for disposal of the bundle. The bundle score 315 including an identifier of the preferred method for disposal of the bundle may be passed to the action module 260.

Based on the bundle score 315 and the identifier of the preferred method for disposal of the bundle, the action module 260 may generate a disposal decision signal 320. The action module 260 may communicate the disposal decision signal 320 to the source computing system 120 (e.g., via the network 130) for displaying at a user interface of the source computing system 120. When displayed at the user interface of the source computing system 120, the disposal decision signal 320 may prompt an employee at the source location to dispose the bundle of the unclaimed order using the identified preferred method for disposal of the bundle.

The source computing system 120 may record feedback signal 325 with information about an actual disposal method that was applied by the employee at the source location for disposing the bundle of the unclaimed order in response to the disposal decision signal 320. The online system 140 may receive (e.g., via the machine-learning training module 230) the feedback signal 325 from the source computing system 120 via the network 130. The machine-learning training module 230 may utilize the feedback signal 325 to re-train the pickup handling machine-learning model 305 (e.g., the pickup handling machine-learning sub-model 305A and/or the pickup handling machine-learning sub-model 305B). By utilizing the feedback signal 325, the machine-learning training module 230 may update the set of parameters of the pickup handling machine-learning model 305 (including the set of parameters of the pickup handling machine-learning sub-model 305A and/or the set of parameters of the pickup handling machine-learning sub-model 305N) and continuously improve the machine-learning algorithm of the pickup handling machine-learning model 305.

FIG. 4 is a flowchart for a method of using a trained machine-learning model of an online system to handle unclaimed online pickup orders, in accordance with one or more embodiments. Alternative embodiments may include more, fewer, or different steps from those illustrated in FIG. 4, and the steps may be performed in a different order from that illustrated in FIG. 4. These steps may be performed by an online system (e.g., the online system 140). Additionally, each of these steps may be performed automatically by the online system without human intervention.

The online system 140 determines 405 (e.g., via the pickup handling module 250) that an order placed by a user of the online system 140 is unclaimed at a location of a source associated with the online system 140, the unclaimed order including one or more bundles, each of the one or more bundles including one or more items. The online system 140 may determine that the order is unclaimed by determining (e.g., via the pickup handling module 250) that the order is not picked up by the user at the location of the source after a threshold time following a scheduled pickup time for the order.

The online system 140 obtains 410 (e.g., via the pickup handling module 250), via a network (e.g., the network 130) from at least one of a device of a picker associated with the online system 140 (e.g., the picker client device 110) or a device associated with the source (e.g., the source computing system 120), signals with information about each item in each bundle of the one or more bundles. The online system 140 may receive (e.g., via the pickup handling module 250), from the device of the picker via the network, a packing plan for the order including information about which item is located in which bundle of the one or more bundles and information about a quantity of each item in each bundle of the one or more bundles. The online system 140 may obtain the signals by retrieving (e.g., via the pickup handling module 250), from a database of the online system 140 (e.g., the data store 240) based on the packing plan, information about one or more features of each item in each bundle of the one or more bundles. The online system 140 may retrieve the information about one or more features of each item by retrieving (e.g., via the pickup handling module 250) at least one of: an identifier of each item, a name of each item, information about one or more taxonomy nodes each item belongs to, information about an expiry date of each item, or a weight of each item.

The online system 140 may obtain the signals by receiving (e.g., via the pickup handling module 250), from the device associated with the source via the network, the signals including computer vision data associated with each bundle of the one or more bundles gathered via one or more computer vision sensors at the source location. Alternatively or additionally, the online system 140 may obtain the signals by receiving (e.g., via the pickup handling module 250), via the network from the device associated with the source, the signals including information about packaging of each item in each bundle of the one or more bundles.

The online system 140 accesses 415 a pickup handling machine-learning model of the online system 140 (e.g., via the pickup handling module 250), wherein the pickup handling machine-learning model is trained to identify, from a set of disposal methods, a preferred method for disposal of each bundle of the one or more bundles. The online c system 140 applies 420 the pickup handling machine-learning model (e.g., via the pickup handling module 250) to identify, based at least in part on the obtained signals, the preferred method for disposal of each bundle of the one or more bundles.

In one or more embodiments, the online system 140 applies the pickup handling machine-learning model (e.g., via the pickup handling module 250) to output, based at least in part on the obtained signals, a set of scores for each bundle of the one or more bundles, each score from the set of scores indicative of how successfully each bundle of the one or more bundles can be disposed using a respective disposal method from the set of disposal methods. The online system 140 may identify (e.g., via the pickup handling module 250), based on the set of scores, the preferred method for disposal of each bundle of the one or more bundles, the preferred method for disposal associated with a highest score among the set of scores.

In one or more other embodiments, the online system 140 applies a first pickup handling machine-learning sub-model of the pickup handling machine-learning model (e.g., via the pickup handling module 250) to output, based at least in part on the obtained signals, a first set of scores for each item in each bundle of the one or more bundles, each score from the first set of scores indicative of how successfully each item in each bundle of the one or more bundles can be disposed using a respective disposal method from the set of disposal methods. The online system 140 may identify (e.g., via the pickup handling module 250), based on the first set of scores for each item in each bundle, a disposal method for each item in each bundle, the identified disposal method for each item associated with a highest score among the first set of scores. After that, the online system 140 may apply a second pickup handling machine-learning sub-model of the pickup handling machine-learning model (e.g., via the pickup handling module 250) to output, based at least in part on the identified disposal method for each item in each bundle, a second set of scores for each bundle of the one or more bundles, each score from the second set of scores indicative of how successfully each bundle of the one or more bundles can be disposed using a respective disposal method from the set of disposal methods. Finally, the online system 140 may identify (e.g., via the pickup handling module 250), based on the second set of scores, the preferred method for disposal of each bundle of the one or more bundles, the preferred method for disposal associated with a highest score among the second set of scores, The online system 140 generates 425 (e.g., via the action module 260), based on the identified preferred method for disposal of each bundle, a disposal decision signal. The online system 140 communicates 430 (e.g., via the action module 260), via the network, the disposal decision signal to the device associated with the source, the disposal decision signal causing the device associated with the source to display a user interface that prompts personnel at the location of the source to dispose each bundle of the one or more bundles using the identified preferred method for disposal.

The online system 140 may generate training data by retrieving (e.g., via the machine-learning training module 230), from a database of the online system 140 (e.g., the data store 240), data with information about a cost for picking each item from a collection of items. Alternatively or additionally, the online system 140 may query (e.g., via the machine-learning training module 230) a plurality of employees at the location of the source to provide ranking of each disposal method from the set of disposal methods for disposing each bundle from a collection of bundles. In such cases, the online system 140 may generate (e.g., via the machine-learning training module 230) training data based on the ranking of each disposal method from the set of disposal methods provided by the plurality of employees. The online system 140 may train (e.g., via the machine-learning training module 230), using the training data, the pickup handling machine-learning model to generate a set of initial values for a set of parameters of the pickup handling model.

The online system 140 may collect (e.g., via the machine-learning training module 230) feedback data by receiving, from the device associated with the source via the network, information about a disposal method from the set of disposal methods that was applied by the personnel at the location of the source for disposing each bundle of the one or more bundles in response to the disposal decision signal. Alternatively, the online system 140 may collect (e.g., via the machine-learning training module 230) feedback data by receiving, from the device associated with the source via the network, an override signal generated by the personnel via a user interface of the device associated with the source, the override signal indicating that the personnel conducted a method for disposing each bundle of the one or more bundles that is different from the identified preferred method. The online system 140 may re-train the pickup handling machine-learning model by updating (e.g., via the machine-learning training module 230), using the collected feedback data, the set of parameters of the pickup handling machine-learning model.

Embodiments of the present disclosure are directed to the online system 140 that utilizes a trained machine-learning model to identify a preferred method of handling each bundle of items of an unclaimed online pickup order, i.e., whether to restock items from the bundle or to apply some other more appropriate disposal method.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality.

Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method, performed at a computer system comprising a processor and a computer-readable medium, comprising:
   identifying that an order placed by a user of the computer system is unclaimed at a location of a source, the unclaimed order including one or more bundles, each of the one or more bundles including two or more items;
   applying, by a device associated with the source that is placed at the location of the source and using computer vision sensors mounted to the device associated with the source, computer vision of bags storing a plurality of items of the order in the location of the source to gather data including information about one or more storage conditions for each item of the plurality of items in each bundle of the one or more bundles, wherein the device associated with the source is in communication with the computer system;
   receiving, at a pickup handling module of the computer system, via a network and from the device associated with the source, the gathered data;
   accessing, via the pickup handling module, a pickup handling model, wherein the pickup handling model is a machine-learning model trained to identify, from a set of disposal methods, a preferred method for disposal of each bundle of the one or more bundles;
   applying, via the pickup handling module, the pickup handling model to the gathered data to identify the preferred method for disposal of each bundle of the one or more bundles;
   generating, based on the identified preferred method for disposal of each bundle, a disposal decision signal; and
   communicating, via the network, the disposal decision signal to the device associated with the source, the disposal decision signal causing the device associated with the source to display a user interface that prompts personnel at the location of the source to dispose each bundle of the one or more bundles using the identified preferred method for disposal.

2. The method of claim 1, wherein identifying that the order is unclaimed comprises:
   identifying that the order is not picked up by the user at the location of the source after a threshold time following a scheduled pickup time for the order.

3. The method of claim 1, further comprising:
   receiving, via the network and from a device associated with a picker, a packing plan for the order including information about which item is located in which bundle of the one or more bundles and information about a quantity of each item in each bundle of the one or more bundles;
   retrieving, from a database of the computer system and using the packing plan, information about one or more features of each item in each bundle of the one or more bundles; and
   applying, via the pickup handling module, the pickup handling model further to the information about one or more features of each item to identify the preferred method for disposal of each bundle of the one or more bundles.

4. The method of claim 3, wherein retrieving the information about one or more features of each item comprises:
   retrieving, from the database, at least one of an identifier of each item, a name of each item, information about one or more taxonomy nodes each item belongs to, information about an expiry date of each item, or a weight of each item.

5. The method of claim 1, further comprising:
   receiving, via the network and from the device associated with the source, information about packaging of each item in each bundle of the one or more bundles; and
   applying, via the pickup handling module, the pickup handling model further to the information about packaging of each item to identify the preferred method for disposal of each bundle of the one or more bundles.

6. The method of claim 1, wherein applying the pickup handling model comprises:
   applying, via the pickup handling module, the pickup handling model to the gathered data to generate a set of scores for each bundle of the one or more bundles, each score from the set of scores indicative of how successfully each bundle of the one or more bundles can be disposed using a respective disposal method from the set of disposal methods; and
   identifying, using the set of scores, the preferred method for disposal of each bundle of the one or more bundles, the preferred method for disposal associated with a highest score among the set of scores.

7. The method of claim 1, wherein applying the pickup handling model comprises:

applying a first pickup handling machine-learning sub-model of the pickup handling model to the gathered data to generate a first set of scores for each item in each bundle of the one or more bundles, each score from the first set of scores indicative of how success-fully each item in each bundle of the one or more bundles can be disposed using a respective disposal method from the set of disposal methods;

identifying, using the first set of scores for each item in each bundle, a disposal method for each item in each bundle, the identified disposal method for each item associated with a highest score among the first set of scores;

applying a second pickup handling machine-learning sub-model of the pickup handling model to information about the identified disposal method for each item in each bundle to generate a second set of scores for each bundle of the one or more bundles, each score from the second set of scores indicative of how successfully each bundle of the one or more bundles can be disposed using a respective disposal method from the set of disposal methods; and identifying, using the second set of scores, the preferred method for disposal of each bundle of the one or more bundles, the preferred method for disposal associated with a highest score among the second set of scores.

8. The method of claim 1, further comprising:

generating training data by retrieving, from a database of the computer system, data with information about a cost for picking each item from a collection of items; and training, using the training data, the pickup handling model to generate a set of initial values for a set of parameters of the pickup handling model.

9. The method of claim 1, further comprising:

querying a plurality of employees at the location of the source to provide ranking of each disposal method from the set of disposal methods for disposing each bundle from a collection of bundles;

generating training data based on the ranking of each disposal method from the set of disposal methods provided by the plurality of employees; and training, using the training data, the pickup handling model to generate a set of initial values for a set of parameters of the pickup handling model.

10. The method of claim 1, further comprising:

collecting feedback data by receiving, via the network and from the device associated with the source, information about a disposal method from the set of disposal methods that was applied by the personnel at the location of the source for disposing each bundle of the one or more bundles in response to the disposal deci-sion signal; and re-training the pickup handling model by updating, using the collected feedback data, a set of parameters of the pickup handling model.

11. The method of claim 1, further comprising:

collecting feedback data by receiving, via the network and from the device associated with the source, an override signal generated by the personnel via a user interface of the device associated with the source, the override signal indicating that the personnel conducted a method for disposing each bundle of the one or more bundles that is different from the identified preferred method; and re-training the pickup handling model by updating, using the collected feedback data, a set of parameters of the pickup handling model.

12. A computer program product comprising a non-transitory computer readable storage medium having instructions encoded thereon that, when executed by a processor, cause the processor to perform steps comprising:

identifying that an order placed by a user of a computer system is unclaimed at a location of a source, the unclaimed order including one or more bundles, each of the one or more bundles including two or more items;

applying, by a device associated with the source that is placed at the location of the source and using computer vision sensors mounted to the device associated with the source, computer vision of bags storing a plurality of items of the order in the location of the source to gather data including information about one or more storage conditions for each item of the plurality of items in each bundle of the one or more bundles, wherein the device associated with the source is in communication with the computer system;

receiving, at a pickup handling module of the computer system, via a network and from the device associated with the source, the gathered data;

accessing, via the pickup handling module, a pickup handling model, wherein the pickup handling model is a machine-learning model trained to identify, from a set of disposal methods, a preferred method for disposal of each bundle of the one or more bundles;

applying, via the pickup handling module, the pickup handling model to the gathered data to identify the preferred method for disposal of each bundle of the one or more bundles;

generating, based on the identified preferred method for disposal of each bundle, a disposal decision signal; and communicating, via the network, the disposal decision signal to the device associated with the source, the disposal decision signal causing the device associated with the source to display a user interface that prompts personnel at the location of the source to dispose each bundle of the one or more bundles using the identified preferred method for disposal.

13. The computer program product of claim 12, wherein the instructions further cause the processor to perform steps comprising at least one of:

receiving, via the network and from a device associated with a picker, a packing plan for the order including information about which item is located in which bundle of the one or more bundles and information about a quantity of each item in each bundle of the one or more bundles;

retrieving, from a database of the computer system and using the packing plan, information about one or more features of each item in each bundle of the one or more bundles; and applying, via the pickup handling module, the pickup handling model further to the information about one or more features of each item to identify the preferred method for disposal of each bundle of the one or more bundles.

14. The computer program product of claim 13, wherein the instructions further cause the processor to perform steps comprising:

receiving, via the network and from the device associated with the source, information about packaging of each item in each bundle of the one or more bundles; and applying, via the pickup handling module, the pickup handling model further to the information about packaging of each item to identify the preferred method for disposal of each bundle of the one or more bundles.

15. The computer program product of claim 12, wherein the instructions further cause the processor to perform steps comprising:

applying, via the pickup handling module, the pickup handling model to the gathered data to generate a set of scores for each bundle of the one or more bundles, each score from the set of scores indicative of how successfully each bundle of the one or more bundles can be disposed using a respective disposal method from the set of disposal methods; and identifying, using the set of scores, the preferred method for disposal of each bundle of the one or more bundles, the preferred method for disposal associated with a highest score among the set of scores.

16. The computer program product of claim 12, wherein the instructions further cause the processor to perform steps comprising:

applying a first pickup handling machine-learning sub-model of the pickup handling model to the gathered data to generate a first set of scores for each item in each bundle of the one or more bundles, each score from the first set of scores indicative of how successfully each item in each bundle of the one or more bundles can be disposed using a respective disposal method from the set of disposal methods;

identifying, using the first set of scores for each item in each bundle, a disposal method for each item in each bundle, the identified disposal method for each item associated with a highest score among the first set of scores;

applying a second pickup handling machine-learning sub-model of the pickup handling model to information about the identified disposal method for each item in each bundle to generate a second set of scores for each bundle of the one or more bundles, each score from the second set of scores indicative of how successfully each bundle of the one or more bundles can be disposed using a respective disposal method from the set of disposal methods; and identifying, using the second set of scores, the preferred method for disposal of each bundle of the one or more bundles, the preferred method for disposal associated with a highest score among the second set of scores.

17. The computer program product of claim 12, wherein the instructions further cause the processor to perform steps comprising:

generating training data by retrieving, from a database of the computer system, data with information about a cost for picking each item from a collection of items; and training, using the training data, the pickup handling model to generate a set of initial values for a set of parameters of the pickup handling model.

18. The computer program product of claim 12, wherein the instructions further cause the processor to perform steps comprising:

collecting feedback data by receiving, via the network and from the device associated with the source, information about a disposal method from the set of disposal methods that was applied by the personnel at the location of the source for disposing each bundle of the one or more bundles in response to the disposal decision signal; and re-training the pickup handling model by updating, using the collected feedback data, a set of parameters of the pickup handling model.

19. A computer system comprising:

a processor; and a non-transitory computer-readable storage medium having instructions that, when executed by the processor, cause the computer system to perform steps comprising:

identifying that an order placed by a user of the computer system is unclaimed at a location of a source, the unclaimed order including one or more bundles, each of the one or more bundles including two or more items;

applying, by a device associated with the source that is placed at the location of the source and using computer vision sensors mounted to the device associated with the source, computer vision of bags storing a plurality of items of the order in the location of the source to gather data including information about one or more storage conditions for each item of the plurality of items in each bundle of the one or more bundles, wherein the device associated with the source is in communication with the computer system;

receiving, at a pickup handling module of the computer system, via a network and from the device associated with the source, the gathered data;

accessing, via the pickup handling module, a pickup handling model, wherein the pickup handling model is a machine-learning model trained to identify, from a set of disposal methods, a preferred method for disposal of each bundle of the one or more bundles;

applying, via the pickup handling module, the pickup handling model to the gathered data to identify the preferred method for disposal of each bundle of the one or more bundles;

generating, based on the identified preferred method for disposal of each bundle, a disposal decision signal; and communicating, via the network, the disposal decision signal to the device associated with the source, the disposal decision signal causing the device associated with the source to display a user interface that prompts personnel at the location of the source to dispose each bundle of the one or more bundles using the identified preferred method for disposal.

* * * * *